US008730028B2

(12) United States Patent
Putterman et al.

(10) Patent No.: US 8,730,028 B2
(45) Date of Patent: *May 20, 2014

(54) METHODS AND APPARATUS FOR PROVIDING NOTIFICATIONS IN A MEDIA SYSTEM

(75) Inventors: Daniel Putterman, San Francisco, CA (US); Gregory Peters, Los Gatos, CA (US); Richard Bullwinkle, Palo Alto, CA (US); Kim R. Dykeman, San Francisco, CA (US); Brad Dietrich, San Francisco, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 834 days.

This patent is subject to a terminal disclaimer.

(21) Appl. No.: 12/823,466

(22) Filed: Jun. 25, 2010

(65) Prior Publication Data

US 2010/0277317 A1 Nov. 4, 2010
US 2014/0077948 A9 Mar. 20, 2014

Related U.S. Application Data

(63) Continuation of application No. 11/318,811, filed on Dec. 27, 2005, now Pat. No. 7,768,388.

(60) Provisional application No. 60/641,794, filed on Jan. 5, 2005.

(51) Int. Cl.
*G08B 1/00* (2006.01)
*G08B 1/08* (2006.01)
*H04M 1/725* (2006.01)

(52) U.S. Cl.
USPC .................. 340/531; 340/539.1; 340/539.14; 340/7.58; 340/7.59; 455/412.2; 455/414.1; 725/34; 348/14.04

(58) Field of Classification Search
USPC .................................................. 340/531
See application file for complete search history.

(56) References Cited

U.S. PATENT DOCUMENTS

| | | | | |
|---|---|---|---|---|
| 5,512,935 | A * | 4/1996 | Majeti et al. | 725/33 |
| 6,167,255 | A * | 12/2000 | Kennedy et al. | 455/414.1 |
| 6,543,051 | B1 * | 4/2003 | Manson et al. | 725/33 |
| 6,654,689 | B1 * | 11/2003 | Kelly et al. | 702/3 |
| 7,768,388 | B2 * | 8/2010 | Putterman et al. | 340/531 |
| 2002/0042846 | A1 * | 4/2002 | Bottan et al. | 709/249 |
| 2004/0152493 | A1 * | 8/2004 | Phillips et al. | 455/567 |

* cited by examiner

*Primary Examiner* — Donnie Crosland
(74) *Attorney, Agent, or Firm* — Ropes & Gray LLP

(57) ABSTRACT

A system to convey user alert messages is disclosed. The system may have a alert service coupled between alert providers and a number of households. After receiving in the alert service an alert message from an alert provider, the alert service may alter the alert message to identify the household designated to receive the alert message. The alert service sends a notification to a home media system within the household designated to receive the alert message.

27 Claims, 9 Drawing Sheets

METHODS AND APPARATUS FOR PROVIDING NOTIFICATIONS IN A MEDIA SYSTEM

RELATED APPLICATIONS

This application is a Continuation of U.S. application Ser. No. 11/318,811 filed Dec. 27, 2005, now U.S. Pat. No. 7,768,388 issued on Aug. 3, 2010, which claims the benefit to U.S. Provisional Patent Application No. 60/641,794 filed on Jan. 5, 2005.

FIELD OF THE INVENTION

The present invention relates generally to media systems, and more specifically to conveying third parties alerts and messages to users through a media system.

BACKGROUND

Television surrounds American lives. About 98.3% of the homes in the United States have television sets, with an average of 2.2 sets per household. Television is turned on more than seven hours per day in the average home, with each individual watching approximately four and a half hours per day. In a recent time-use survey sponsored by the Bureau of Labor Statistics and conducted by the U.S. Census Bureau, the Bureau found that watching television was the leisure activity that occupied the most time. In fact, watching television accounted for about half of leisure time on average for both men and women.

The fast pace of modern life, however, requires people to maintain some contact with events in the world outside the home. For example, investors may desire to receive from brokerage accounts a notification when a stock reaches a certain price. As a further example, online auction bidders may wish to receive information regarding a current bid on a particular item. These messages or notifications are typically sent to the user's email account, pager or telephone. In addition to receiving specific notifications, a user may desire to receive general alerts from third parties, such as information about a sale at a particular store. Third parties, in turn, may desire to send alerts to a particular class of users.

A problem with receiving notifications via email, pager or telephone is that the user must have access to particular devices, e.g., a computer or telephone. It may not be convenient for the user to access these devices. Also, if users decide that they do not want to receive the preset alert because they do not care to receive the alert while watching television, the users must then disrupt their leisure time to access their accounts and alter the previously set alert settings.

Thus, there is a need for a system that may unobtrusively interrupt a user to alert the user of information and events. There is also a need for a general notification gateway to the user from a single service provider outside of the home to aggregate third party alerts for the users in the home.

SUMMARY

An alert notification system informs user of events while the user is watching television. The user has the flexibility to receive some information asynchronously on their television while viewing entertainment. As such, the user may increase their enjoyment of watching television by not worrying about missing event information.

A system to convey user alert messages is disclosed. The system may have an alert service coupled between alert providers and a number of households. After receiving an alert message from an alert provider, the alert service routes the alert message to all households designated to receive the alert message. Optionally, the alert message is altered to form a user alert message. The alert service can also queue an alert message for individual households in storage and send the alert message to a home media system within the household designated to receive the alert message.

DETAILED DESCRIPTION

Figure 1:
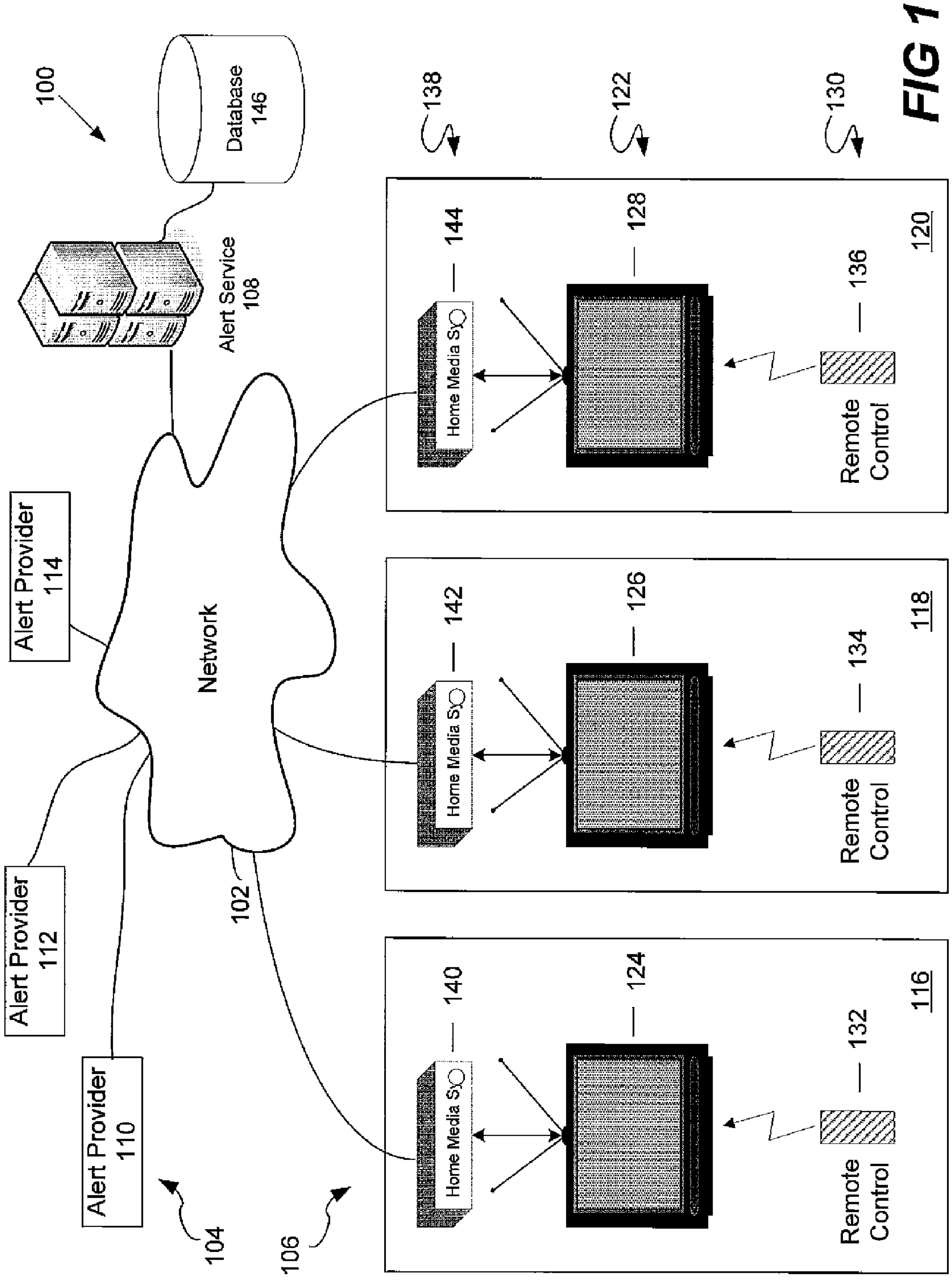
FIG. 1 is a perspective view of an alert distribution system 100.

FIG. 1 is a block diagram illustrating one embodiment of an alert distribution system 100. For this embodiment, the alert distribution system 100 includes network 102, one or more alert providers 104, households 106, and an alert service 108.

An alert message may be a notification informing its recipient of an event. An individual residing in a household 106 and using the alert distribution system 100 may be referred to as a user. In general, alert distribution system 100 may pass alert messages over network 102 from third parties, such as alert providers 104, through alert service 108 to users in a specific household, such as one or more of households 106. The users may be made aware of alert messages through their television. The alert message may be interactive, and the user may have control over both the receipt of the alert message and action taken upon a user alert message. In one embodiment, the user subscribes to the alert service.

Network 102 communicates alert messages from alert providers 104 to households 106. Network 102 may include a collection of computers interconnected by telephone lines, coaxial cables, satellite links, radio, wireless/broadband wireless, cellular telephone, PCS digital cellular, IP over electrical wiring, and/or some other communication or network technique. Network 102 may comprise a public distribution network, such as the Internet, or may comprise a private distribution network, such as a cable television network. If the distribution network is private, the alert providers may communicate with the alert service on a network separate from the household-alert service network. For example, in a cable network, the alert messages may be transmitted, via the Internet, to alert service hosted at a cable provider, and then delivered to the households over the cable network.

Alert providers 104 may be third party alert providers residing outside of a household 106. For example, alert providers 104 may be operated by businesses, such as stockbrokers and auction houses, to provide alerts and notifications to their customers. In addition, the alert messages may be from any source to allow any entity to transmit alert messages to households 106. Alert providers 104 may also be a user within a household 106. For example, a user in households 106 may receive an alert from an oven appliance of the user indicating that a turkey cooking in the oven is done, or the user may simply want to set an alarm program from that device to alert them when it is a certain time of day or when a particular television program is on so that they can change the channel. Although FIG. 1 shows three alert providers 110, 112, and 114, there is no limit to the number of alert providers 104.

Households 106 may include a plurality of households, such as household 116, household 118, and household 120. Each household 106 may be referred to as an occupied dwelling unit. Households 106 may include all persons who occupy a housing unit. A housing unit may be a group of rooms or a single room occupied as separate living quarters where occupants live and eat separately from other persons in the building, and have direct access from outside the building or through a common hall. Each household 106 may include more than one family. Households 106 are not limited to occupied dwelling units. Since the alert messages may be directed to any television 122 located anywhere, households 106 may include an office, a school classroom, a room in a government building, or any bounded or unbounded location in which a television 122 may reside. Although FIG. 1 shows three households 116, 118 and 120, there is no limit to the number of households 106.

Each household 106 may include a television 122 (such as televisions 124, 126, and 128), a remote control device 130 (such as remote control devices 132, 134, and 136), and a home network interface 138 (such as home network interfaces 140, 142, and 144). Television 122 may be a dedicated push media device for receiving streaming video, by terrestrial radio broadcast, satellite, or and/or cable. In other embodiments, the television 122 is a closed device, for example, a television without cable but having a network connection and being connected to a DVD player. The streaming video received by television 122 may be a television broadcast picture scene from a television broadcast source, a movie streamed from a connected DVD player, or any other source. As used herein, the term "television" indicates any display device and is used interchangeably with the term "display device." For illustrative purposes, the term "television" is used in the description below, although in other embodiments, other display devices are used.

Remote control device 130 may be any device used to control television 122 or home network interface 138 from a distance. Preferably, remote control device 130 may include push buttons that provide input selection and include a communication head that transmits user selected inputs to television 122 or home network interface 138.

In one embodiment, alert distribution system 100 includes one or more services, such as alert service 108. Alert service 108 may be a computer on network 102 dedicated to receiving, managing and distributing alert messages. Alert service 108 may store information, related to the alert messages, in database 146. In one embodiment, alert service 108 runs applications to process alert messages from different alert providers 104. In some embodiments, alert service comprises a central server. Alert service 108 acts as a central point of alert distribution system 100 to aggregate alert messages and responses to alert messages. In other embodiments, the alert service 108 is composed of a plurality of hardware spanning different physical locations and/or geographies, which may be directly linked, or linked through a network, such as the Internet.

Typically, home computer users prevent outside access to their computers by running firewall software. In one embodiment of the alert notification system, users pull alert notifications from alert service 108 (i.e., as opposed to allowing third parties to electronically send messages directly to households 106). Other technological issues, such as proper acknowledging handshakes and data transmission rates, may restrict or prevent third parties from sending notification messages directly to household 106. Alert service 108 operates as a central repository, outside of households 106, to aggregate alert messages for the users in households 106 and provide a trusted source for information to be allowed through the firewall.

The above devices may be included as part of a service model, where alert service 108 resides outside of, and remote from, households 106. In such a service model, alert service 108 itself may be an alert provider 104. In some embodiments, alert service 108 comprises any type of server, such as an Active Server Pages (ASP) server and may serve as a general notification gateway to service alert providers 110 and service users in households 106 on an individual basis.

Each household 106 includes a home media system 138. A home media system may be used to launch remote applications for the alert notification system. In some embodiments, the home media system uses a client-server mechanism to launch remote applications for the television. As such, the architecture comprises a three-tier system: the alert service, the home media system server and the home media system client. For this embodiment, the home media system includes at least one server, a network, and at least one client. The server portion of the home media system may be implemented using a computer or a media server device. The client portion, referred to as a digital media adapter ("DMA"), operates as a client to interface media devices to the system. For example, televisions 124, 126 and 128 may be coupled to a DMA to provide full functionality of services available on the home network to televisions 124, 126 and 128. In other embodiments, the home media system comprises the DMA whereby alerts are provided directly to the DMA from network 102 and displays user alert messages on a television. The DMA may also send back any response to the user alert messages from the user to alert service 108 to execute an action.

Figure 2:
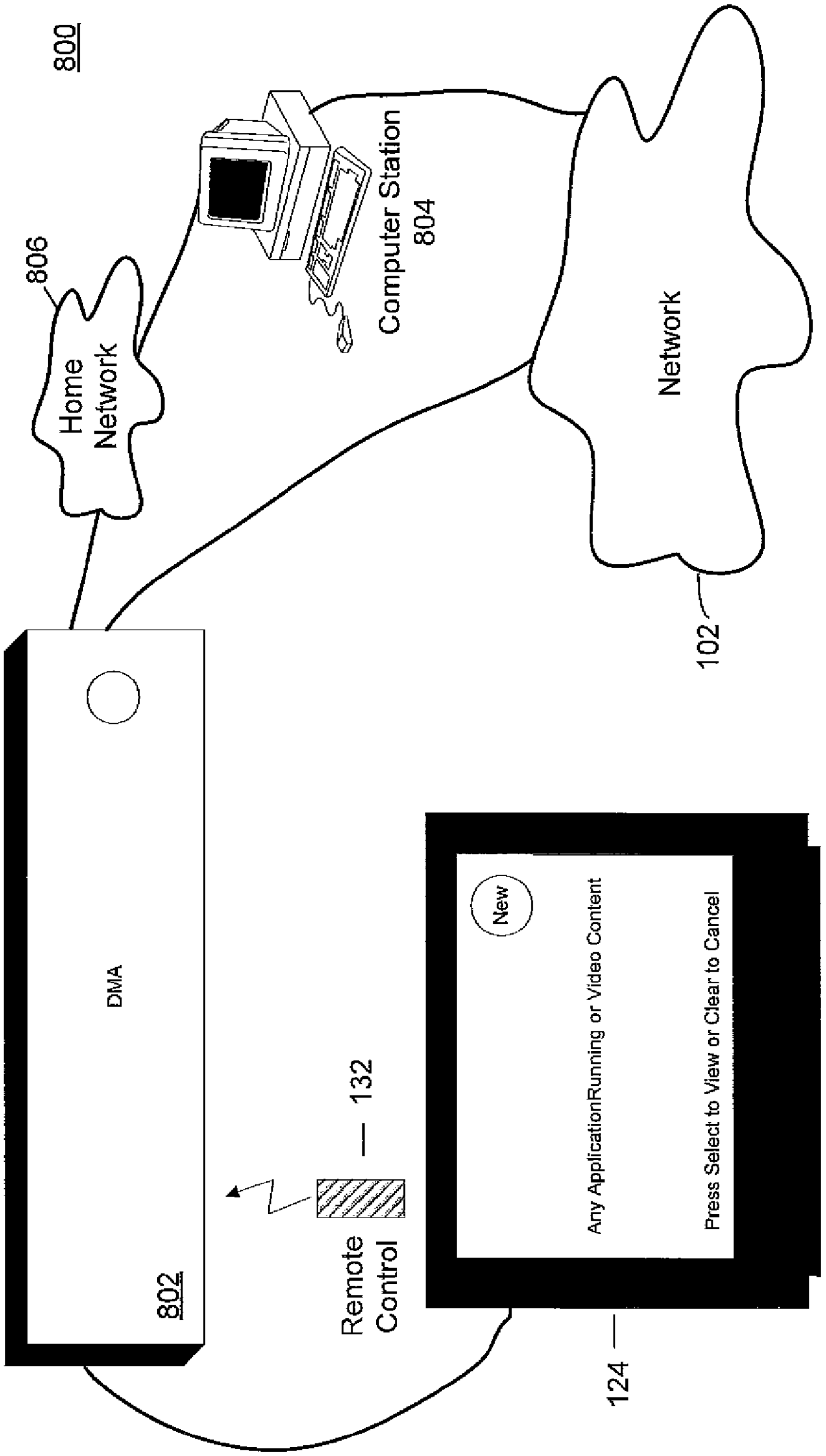
FIG. 2 illustrates one embodiment for a home media system.

FIG. 2 illustrates examples of different possible configurations of a home media system. A computer 804, digital media adapter ("DMA") 802 and home network 806 are shown in FIG. 2 as one example home media system. Home media network 806 couples computer 804 to DMA 802. DMA 802 integrates television 124 into the home media system. Although the example home media system of FIG. 2 shows a DMA coupled to a television, the home media system may include multiple DMAs that operate as clients for multiple media devices (e.g., televisions, stereos, CD players, DVD players, etc.).

The DMA (802) delivers user alert notifications to the television 124. In one embodiment, a user alert notification application is run on the DMA. In other embodiments, other applications may run on the alert service 108, on the personal computer on the home network, or on another device. For this implementation, the server remotes the graphical output elements of the applications to the DMA client. The DMA client (802), interpreting the remote application, implements the user interface on television 124 (i.e., the DMA 802 renders UI screens on television 124 and interprets commands from the remote control 132). In one embodiment, the server (804) remotes the graphical output elements of an application to the DMA client (802) via an open standard protocol (e.g., XRT).

The DMA 802 implements a user interface, on television 124, for an alert notification application. In one embodiment, DMA 802 overlays text messages and application buttons on a television broadcast picture displayed at television 124. The user interface allows a user to interact with the notification application while watching television.

DMA 802 may operate with any of the three main television broadcast Standards: National Television System Committee (NTSC), Sequential Color with Memory (or Systeme Electronique Couleur Avec Memoire) (SECAM), and Phase Alternating Line (PAL). DMA 802 may receive video from a pre-tuned composite source, High-Definition Multimedia Interface (HDMI) Video source, Video or S/Video source, or other video source and may receive audio from a stereo left/right source, optical source, or other audio source. In some embodiments, the DMA receives video or audio data and converts the data to a particular output format.

DMA 802 may output television on composite, Video, S/Video, component, and HDMI simultaneously for video. In other embodiments, the DMA 802 may output television on a different standard. The video may be scaled from full screen down to another size (e.g., 6×4 inches) for television 124 as part of a DMA setup procedure. Moreover, DMA 802 may output audio on a digital output and on a stereo left/right simultaneously. A hardware switch on DMA 802 may set the video output resolution. In other embodiments, a software switch activated via a remote control device may set the video output resolution.

In addition to the functions above, DMA 802 may play back the video with audio at various speeds, may pause streamed clips indefinitely, may jump to a particular minute mark in a file and to jump forward and back in predetermined time increments (e.g., 15 minute increments). Moreover, DMA 802 may have a thirty second skip forward.

As shown in FIG. 2, another example of the home media system is where the home media system comprises the DMA which is directly connected with the network 102 to receive user alert messages via the network 102 and display the user alert messages on the television.

There are multiple global settings for a user that control how a notification (i.e., any information regarding the user alert message) interrupts the user and/or interrupts other applications. In some embodiments, the settings include "show" or "not show" to permit or not permit the notifications to be passed to the television, respectively. In other embodiments, the settings may include one or any combination of the following: A. Allow Full Screen Text Message, B. Allow Banner Text Message, C. Allow Icon, D. Allow LED, E. Never Show. Typically, if text messages are permitted in the global settings by permitting A or B, the user alert message is automatically displayed on the television (in either full screen or banner mode) without requiring further input from the user. If text messages are not permitted but icon or LED notification is permitted in the global settings, the user alert message is not automatically displayed on the television until the user selects the user alert message for display.

Alert messages may be pre-configured to have a particular display format (e.g., full screen, banner, icon, etc.) which is referred to as the alert's desired "show" state. In some embodiments, the user's global settings override an alert's desired "show" state. For example, if a received alert has a "show banner" state but the user user's global settings are set at "C. Allow Icon," then only an icon is displayed and not a banner text message. If the user's global settings are set at A or B, however, then a banner text message is displayed. The user may also have more specific settings for particular "authorized" alert providers.

Figure 3A:
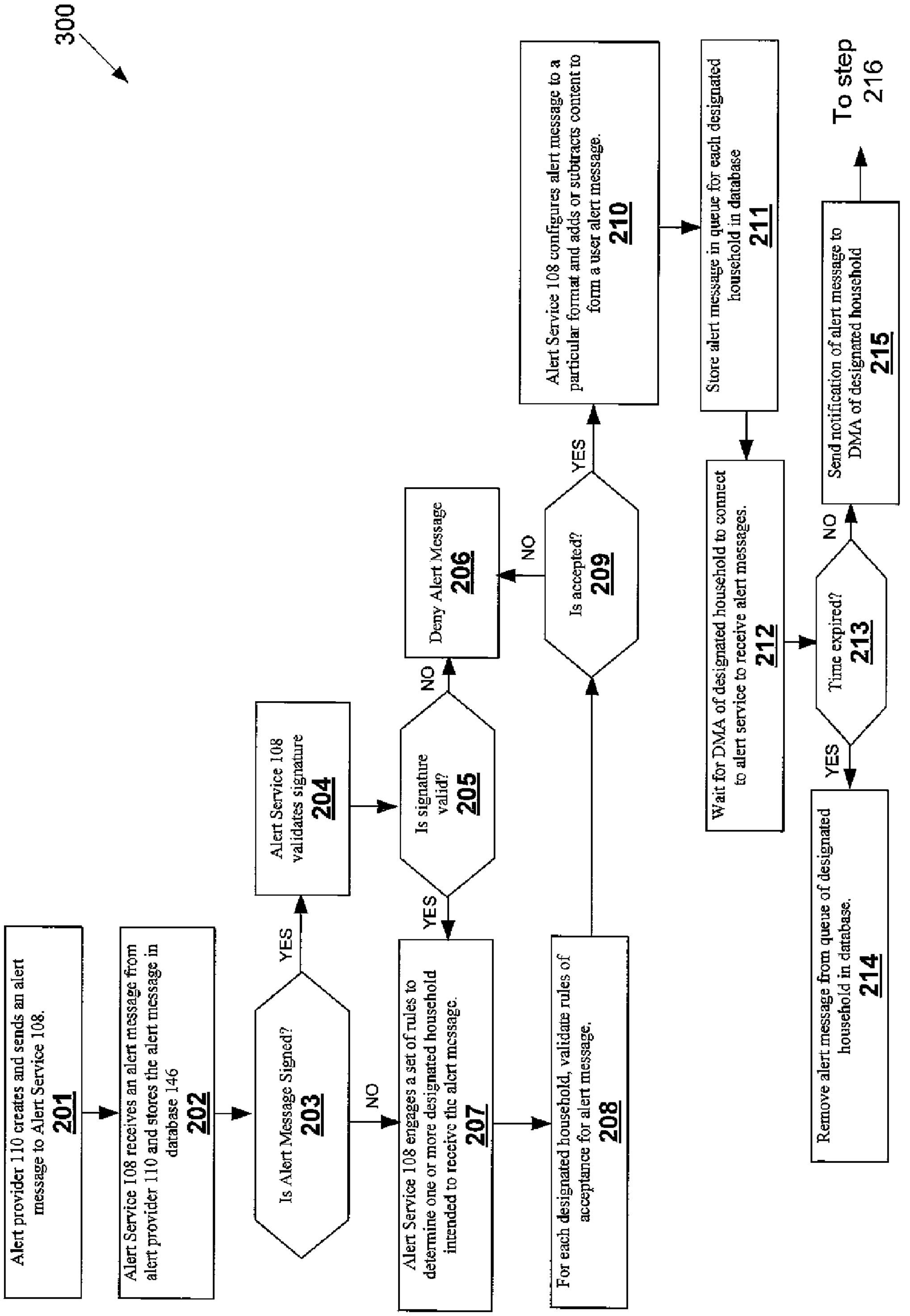
FIGS. 3A-B are flow charts of a method 300 for operating an alert distribution system.
Figure 3B:
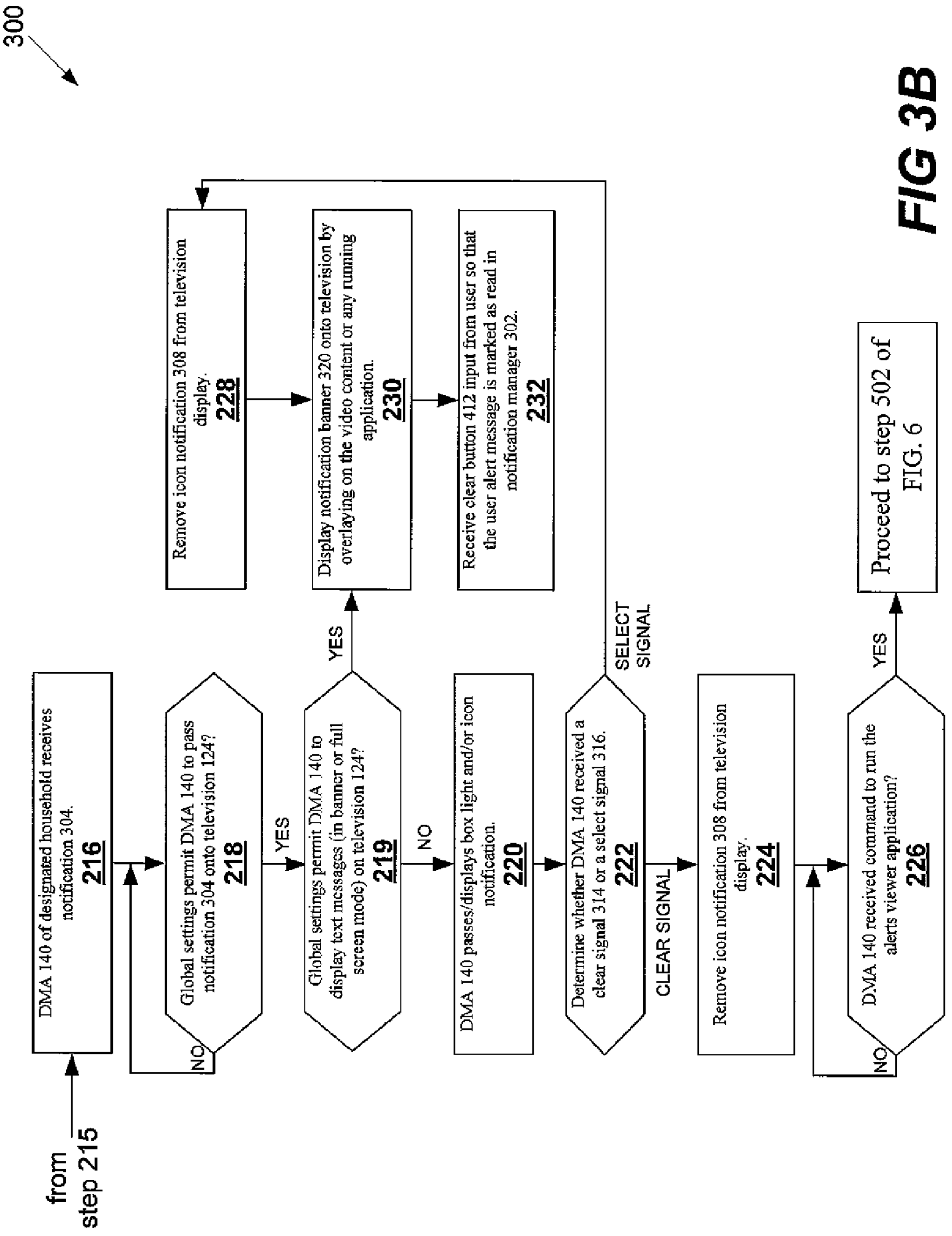
Figure 4:
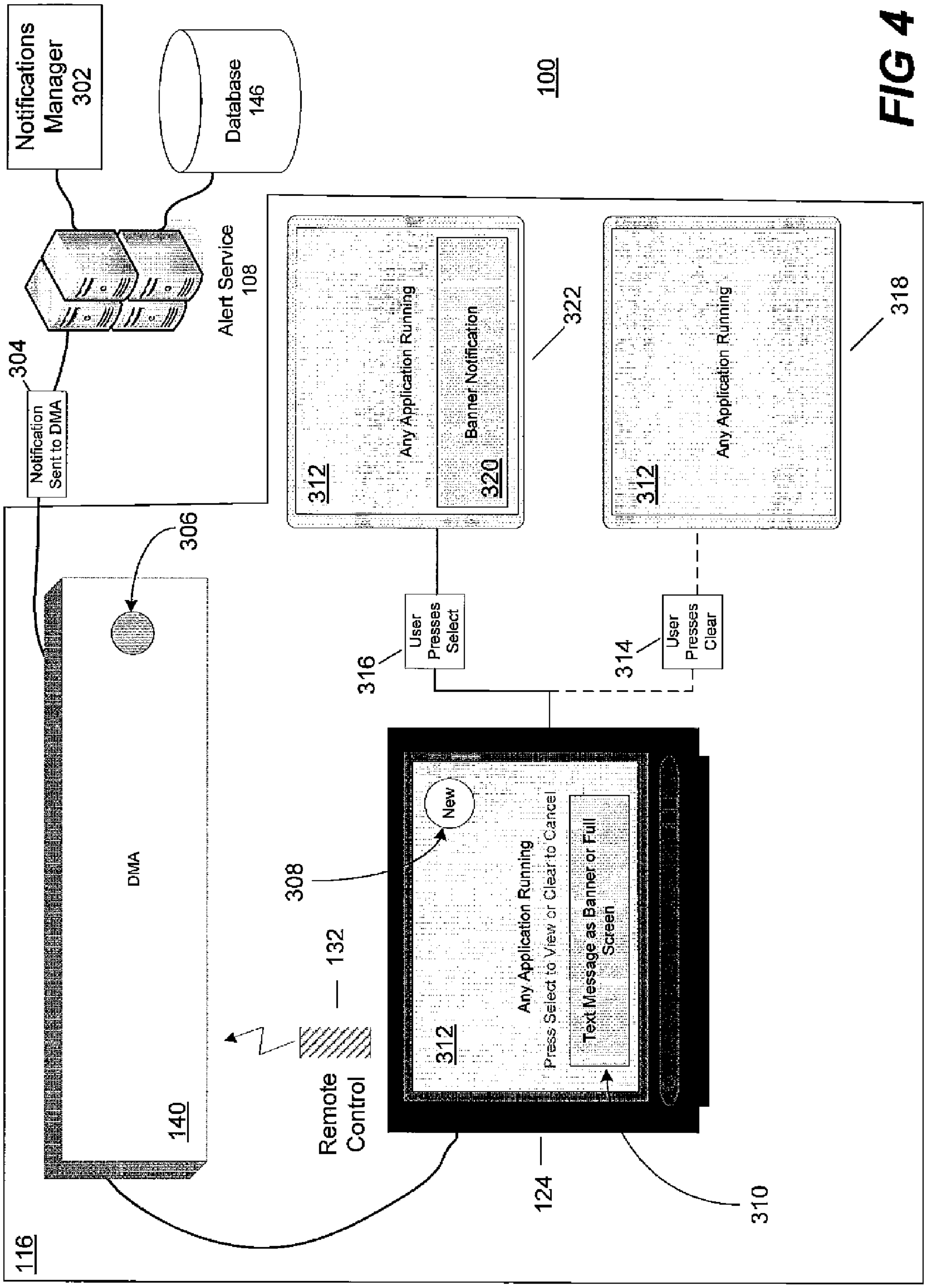
FIG. 4 illustrates one embodiment of an alert distribution system.

FIGS. 3A-B are flow charts of a method 300 for operating an alert distribution system. FIGS. 3A-B are described in relation to FIGS. 1 and 2 which show elements referred to in FIGS. 3A-B. FIGS. 3A-B are also described in relation to FIG. 4 which illustrates examples of particular steps shown in FIGS. 3A-B. FIG. 4 illustrates one embodiment of an alert distribution system comprising an alert service 108 (having a notification manager 302 and a database 146) and a notification 304 of an alert message intended for a designated household 116 (having a DMA 140). Some steps of the method 300 may be implemented in hardware or software, for example, by the notification manager 302 of the alert service or the DMA of the household.

In the operation of this embodiment of the alert distribution system, an alert provider desires to send an alert message to a household. An alert message sent from an alert provider to an alert service may be referred to as an "alert message", and an alert sent from alert service 108 to DMA 140 may be referred to as a "user alert message." The user alert message accounts for any changes to the alert message made by alert service 108. "Alert," "alert message," and "user alert message" may be used interchangeably, however.

The method 300 for operating the alert distribution system begins when an alert provider creates and sends an alert message to alert service 108 at step 201. In some embodiments, the created alert message contains information about the intended destination households. In some embodiments, the alert messages contain information regarding an alert severity level and pre-configured display format (the alert's desired "show" state), as discussed above. Alert provider 110 may use a widely publicized, inbound interface of alert service 108 to transfer the alert message from alert provider 110 to alert service 108. The alerts may be generated by the alert provider manually or generated automatically by a computer. A web interface may be provided for permitting alert provider 110 to send alert messages.

At 202, alert service 108 receives the alert message from alert provider 110 and stores the alert message in database 146. At 203 the alert service 108 determines if the alert message is "signed" (meaning that the alert message contains digital information intended to indicate its authenticity). If so, the alert service 108 validates the signed alert message at 204 and determines if the signature is valid at 205. If the signature is not valid, the alert message is denied at 206 (i.e., deleted and blocked from distribution) and the method ends. If the signature is valid, the method 300 proceeds to step 207.

If the alert service 108 determines that the alert message is not signed (at 203), the method proceeds to step 207 where the alert service 108 uses the information in the alert message about the intended destination and invokes a set of rules to designate one or more recipients for the alert message (i.e., to determine/identify one or more households that are to receive the alert message). In some embodiments, the destination information in the alert message comprises household "address" information that is translated by the set of rules. For example, a particular household may be listed by username that is included as destination information in the alert message. The set of rules then translates the username to an IP address or unique device identification number for a particular DMA in the particular household.

At step 208, for each designated household determined at step 207, the alert service 108 then validates rules of acceptance of the alert message for the designated household. The alert service 108 then determines if the alert message is accepted. If not, alert message is denied at 206 and the method ends. If the alert message is accepted, the method proceeds to step 210.

At 210, alert service 108 optionally alters/modifies the alert message received from alert provider 110 to produce a user alert message. In some embodiments, the alert service 108 configures the received alert message to a particular format or assigns a particular alert severity level or interruption type. In some embodiments, the assigned alert severity level or assigned interruption type determines the manner in which the user is notified of the user alert message (i.e., the manner in which the user alert message is announced).

In further embodiments, the alert service 108 adds and/or removes content of the received alert message to produce the user alert message. For example, the alert service 108 may add information regarding the source of the received alert message or a time stamp of when the alert message was sent. Or the alert service 108 may remove message information if the alert message is to be provided only as a display of an icon. In configuring the alert message, alert service 108 may take into account those users who have been designated to receive the alert message and any formatting information that may be contained in the alert message.

In some embodiments, user alert messages are pre-categorized into two or more different levels of alert severity prior to entering the user's household. In one embodiment, user alert messages are pre-categorized into three levels of alert severity prior to entering the user's household. The alert level may be set by users, alert service, or may be set by providers. The alerts may be categorized as informational, important, and critical. The alert severity may be conveyed to the user in a variety of ways. For example, an informational alert may be conveyed to the user by means of a light flashing on the front of a DMA. Using this type of notification, the user television screen is not obstructed.

An alert with a severity setting of "important" may display a small banner or icon that appears on the television screen. An alert designated as an important alert may contain information that the user may want to review. This type of notification of the alert (e.g., display of icon on the screen) is more visual than a flashing light. If the user so chooses, the user may view the entire message associated with the important alert.

An alert designated with a severity level of "critical" may be conspicuously presented on the television screen (i.e., a graphical depiction that is larger or more visually acute on the screen than a banner or icon). With a critical alert, the message may be immediately displayed for viewing by the user. Thus, for this type of alert, the user would not have to select the message for viewing.

Returning to the method 300, after the alert message is optionally altered at 210, the alert service 108 stores the alert message in database 146 and places the alert message in a queue for each designated household at step 211. Database 146 may be pre-partitioned to serve each individual household 106. Database 146 may hold user designated alert messages until a user retrieves the user alert messages at the alert service or until a predetermined time period for retrieving the alert messages expire.

At 212, the alert service waits for a household DMA to establish a connection with the alert service to receive alert messages. Once connection between the alert service and the DMA is active, alert service 108 may subsequently direct user alert messages to the appropriate household DMA so that the DMA may present new alert messages to the user in real time.

At 213, the alert service determines if the predetermined time period for retrieving the alert message has expired. If so, at 214, the alert message is deleted from the queue in the database for the designated household and the method 300 ends. If not, the alert service sends a notification 304 (comprising the user alert message) to a DMA of a designated household at step 215. Notification 304 may indicate that an alert message has been received at the alert service 108, and a user alert message is ready for viewing.

FIG. 4 shows an example of step 215 of the method 300. After processing an alert message from an alert provider 114, the notification manager 302 of the alert service 108 sends out a notification 304 (comprising the user alert message) to a designated household home media system. In the example shown in FIG. 4, the user alert message is designated for home media system (DMA) 140 of household 116.

At 216 (FIG. 3B), home media system (DMA) 140 receives notification 304 (user alert message). The system permits the user to set global settings that control how a notification/alert interrupts the user and/or interrupts other applications. FIG. 4 shows a window 312 of a television 124 that displays a running application or television, DVD, or other video signal. Three types of interruption techniques are illustrated in FIG. 4: a box light 306, an icon notification 308, or text message 310 (displayed as a banner or full screen message). In some embodiments, the text message 310 contains the content of the user alert message. In other embodiments, the text message 310 contains other information and comprises a notification banner 320 (discussed below in relation to FIG. 5). If global settings allow full screen or banner text messages 310, the received alert message is shown without requiring further interaction from the user.

Light box 306 may be a light emitting diode (LED) located on a front of the box housing DMA 140. When illuminated, light box 306 notifies the user that at least one unread user alert message is waiting. Icon notification 308 may be any subtle image that overlays other application images appearing on window 312 of television 124. The light box 306 and icon notification 308 indicate that a user alert message has been received and can be selected for viewing. In one embodiment, for the light box 306 and icon notification 308, text also appears at the bottom of window 312 to indicate that selection of an user alert message is possible (such as, "Press Select to View or Clear to Cancel"). If global settings only allow icon or light (LED) notification of an alert message, the received alert message is shown after selection of the message by the user. A focus button on remote control 132 allows the user to select an active application. For example, the user may select the alert notification application as the active application. Text message 310 may be the subject of focus control as well.

Each of three types of interruption techniques may also be accompanied by a sound. Each notification or kind of notification may have its own kind of sound. The sounds may be broadcast in conjunction with other sounds occurring on DMA 140. Users may also control the volume (such as, three levels and off) of sound notifications associated with user alert messages.

In addition to the three types of interruption techniques, users may also turn off all notifications or may turn off a notification for one or more classes or providers of user alert messages. Notification 304 may specify a type of notification for each user alert message.

Returning to the method 300 of FIG. 3B, at 218 the method 200 determines whether global settings permit home media system 140 to pass notification 304 onto television 124, such as whether notifications in the global settings has been set to off. If the global settings do not permit home media system 140 to display notification 304 onto television 124, then method 200 returns to step 218 to wait for a change in the global settings. If global settings permit home media system 140 to display notification 304 onto television 124, the method 200 then determines (at 219) whether the global settings permit home media system 140 to display text messages (in banner or full screen mode) onto television 124. If so, the method proceeds to step 230 to display a notification banner 320 (FIG. 4) (in banner or full screen mode) onto television 124 (as discussed further below).

If the global settings do not permit display of text messages, then the DMA 140 passes a box light or icon notification at step 220 (e.g., by illuminating box light 306 or displaying icon notification 308 on window 312, or any combination of the interruption techniques).

Note that in the above embodiments, the size of the alert message is determined by user settings in the DMA, and the format of the alert message is created by the DMA. For example, the alert message from the server may be "stock hits $40" with a "show banner" pre-configured setting that is received by the DMA. If the user's global settings include "allow banners from stock broker", then the DMA creates a banner with the words "stock hits $40", and displays the banner on the television. However, if the user has selected "show only icons" or "show only icons from stock broker", then only an icon is displayed (e.g., an "E" or "$" icon). These settings may be global or may be an alert-specific selection on the DMA. This technique allows the user to decide whether or not they want to get more information or the full banner or to clear it.

At 222 (FIG. 3B), method 200 determines whether DMA 140 received a clear signal 314 or a select signal 316. Clear signal 314 and select signal 316 may be received from remote control 132 (FIG. 4). If clear signal 314 was received, then icon notification 308 is cleared from the screen 318 (FIG. 4) at 224 (FIG. 3B). If a user alert message is left unread in notification manager 302, box light 306 may remain illuminated. If DMA 140 receives a clear signal, then the user may enter the alert notification application directly to read the user alert messages. If all user alert messages are marked as read or all the user alert messages expire, then the box light 306 is turned off. At 226 (FIG. 3B), method 200 determines whether DMA 140 (FIG. 4) received instructions to run the alert notification application. If no, then method 300 returns to step 226. If method 200 determines at 226 that DMA 140 received instructions to run the alert notification application, then method 200 proceeds from step 226 to step 502 of FIG. 6.

If select signal 316 was received at step 222, then icon notification 308 (FIG. 4) is cleared from the television display at step 228. At 230, a notification banner 320 is then displayed on the television by overlaying the notification banner 320 onto the video content or any running application on the display. FIG. 4 shows an example of how the notification banner 320 can be displayed on screen 322. In other embodiments, the notification banner 320 is displayed on screen 322 in another manner. A banner notification sound may be played if the user has turned on such an option. In one embodiment, if notification banner 320 appears while the user has a menu displayed, the menu may be dismissed with no action, and banner notification may appear on top of all applications and have the focus of the remote control 132.

Figure 5:
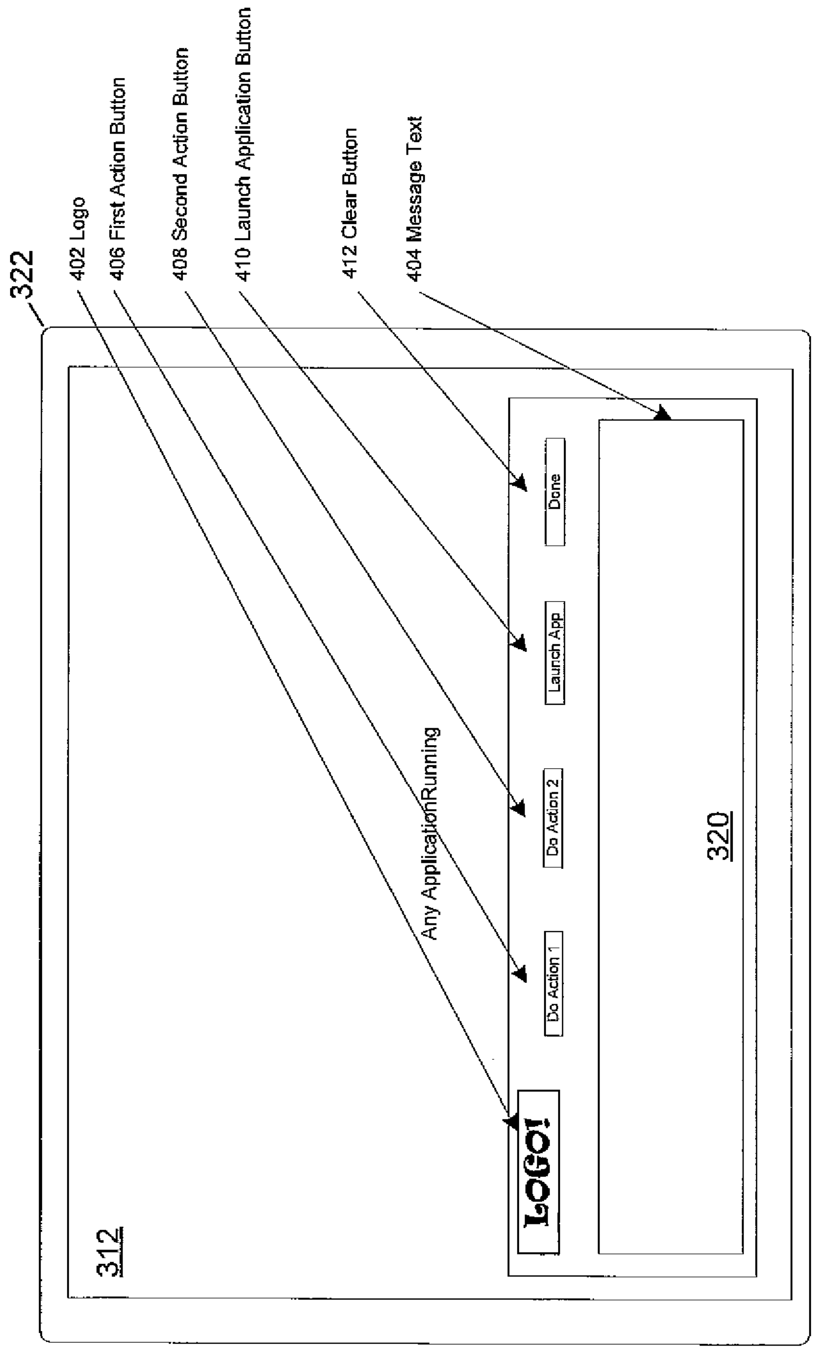
FIG. 5 is a plan view of notification banner 320 on window 312.

FIG. 5 is a plan view of one embodiment of a notification banner 320 on window 312. In some embodiments, the notification banner 320 comprises the text message 310. For this embodiment, notification banner 320 comprises a banner overlaying approximately ⅓ of the size of window 312. Notification banner 320 may contain a logo 402, message text 404, a first action button 406, a second action button 408, a launch application button 410, and a clear button 412.

Logo 402 may be a company mark that identifies the alert provider company originating the user alert notification. Message text 404 is a brief message that contains the content of the user alert message. The message 404 may include one or more basic constraints. In one embodiment, message text 404 contains only a certain amount of text. For example, limiting message 404 to no more than 1,000 characters allows the user to quickly view the alert messages. Experience has shown that alert messages of more than 1,000 characters cannot be consumed quickly. When the text does not fit in the message text portion, the user may scroll the window. In other embodiments, the message 404 may comprise HTML code and contain stylizations of the text or other graphical information.

The action button comprises a small button used in applications to invoke routing functions. Although first action button 406 and second action button 408 are shown in FIG. 5, there may be additional action buttons (e.g., a maximum of five action buttons). The consequence of selecting action button 406 or 408 may be pre-defined by an alert provider, alert service, the user, or by applications running on DMA 140. For example, depressing first action button 406 may send return messages to a service to perform pre-prescribed actions. Replies may be sent to the service within a few seconds of the user action.

For this embodiment, launch application button 410 launches an application, associated with the user alert message. In one embodiment, the application interface is "remoted" from personal computer (PC) that interacts with the DMA. For this embodiment, the application runs on the PC, but the user interface is implemented on the television through the DMA. The DMA 140 and television display (312) may support user interfaces for up to four (4) "remoted" applications simultaneously (e.g., picture in picture) in a variety of windowed layouts. Under this multi-application scenario, the user may toggle control and focus among the windows. Clear button 412 (or done button 412) instructs the system (e.g., DMA 140) to clear with no action or to clear all notification banners on window 322.

In one embodiment, the user navigates within notification banner 320 and activates control focus to a particular button/window as follows. Pressing the left arrow key or right arrow key on remote control 132 moves the highlight to permit selection of displayed functions. Pressing a select key on remote control 132 selects the highlighted action. Pressing an up key or a down key scrolls message text 404 up or down, respectively. Pressing notification on/off button 412 on remote control 132 dismisses notification banner 320, and dismisses any other notifications, underlying notification banner 320, so as to leave the user alert messages unread and light 306 illuminated. A "notification off" message is then displayed on window 312.

In one embodiment, when notification banner 320 is displayed on window 312:

- Users may reply with up to two different choices for replies using reply buttons 406 and 408;
- Users may launch an associated application by depressing launch application button 410;
- Users may clear a single notification banner through clear button 412;
- Notification banners may stack on top of each other with the most recent being top-most. If there is more than one notification banner, an additional clear-all button similar to button 412 may appear allowing the user to dismiss all notification banners;
- Dismissing an individual notification banner may mark the alert as being "read;"
- Executing a "Clear All" action on more than one notification banner leaves the notification banners unread and light 306 (FIG. 4) on; and Executing a service action or launching an application from banner notification 320 deletes the user alert message in notification manager 302.

Although any of the above actions may be a next step in method 200, method 200 may proceed as follows. At step 232, the user depresses clear button 412 so that the user alert message is marked as read in notification manager 302. Depressing the clear button 412 also removes notification banner 320 from window 312, and control focus is restored to the previously displayed video content or running application.

Figure 6:
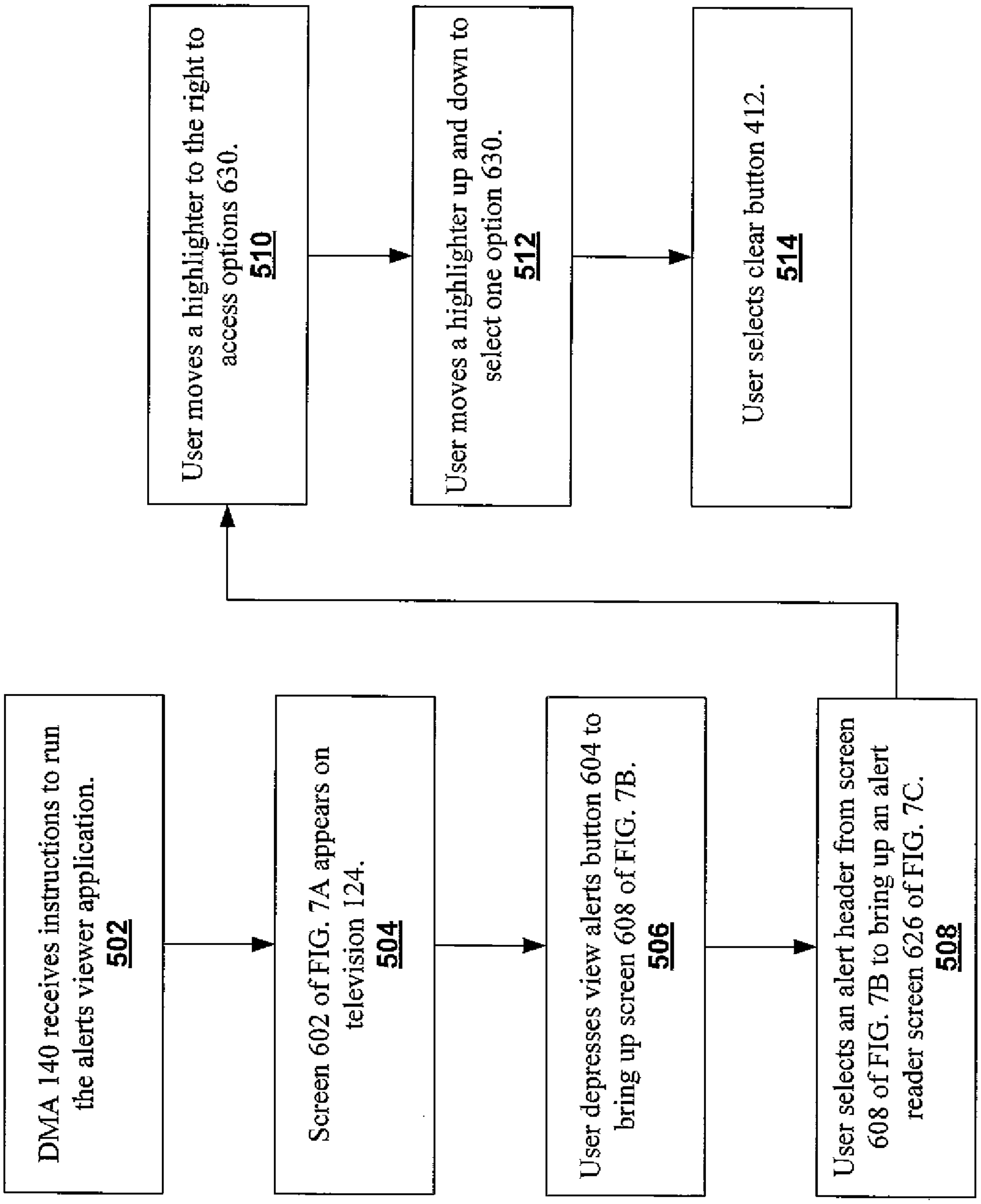
FIG. 6 is method to operate an alerts viewer application.

Recall that if method 200 determines at 224 that DMA 140 received instructions to run the alert notification application, then method 400 proceeds from step 226 to step 502 of FIG. 6. FIG. 6 is a flow diagram illustrating one method to operate an alert notification application. FIGS. 7A-7D illustrate plan views of various user interface screens for operation with the alert notification application.

Figures 7A, 7B, 7C, 7D:
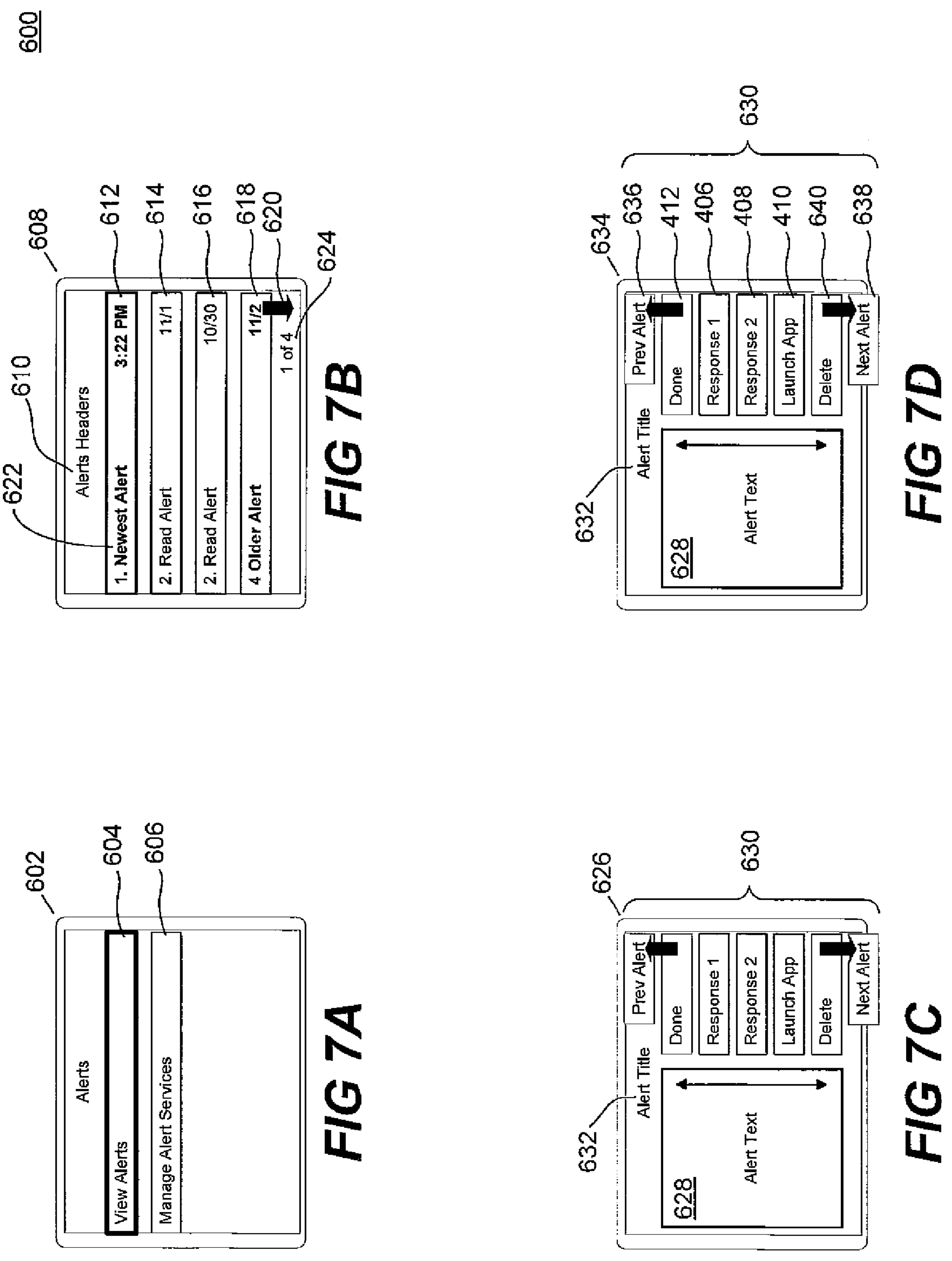
FIG. 7A is a plan view of screen 602.
FIG. 7B is a plan view of screen 608.
FIG. 7C is a plan view of alert reader screen 626.
FIG. 7D is a plan view of screen 634.

At step 502, DMA 140 receives input to initiate the alert notification application. At 504, screen 602 of FIG. 7A is displayed on television 124 (FIG. 2). FIG. 7A is a plan view of screen 602. Screen display 602 includes a view alerts button 604 and a manage alert services button 606. When the user selects the view alerts function 604, the alert notification application displays screen 608 of FIG. 7B. If the user depresses the manage alert services button 606, the application displays alert management options as discussed below.

At 506, a user may select view alerts button 604, and in response, the application displays screen 608 of FIG. 7B. FIG. 7B illustrates an example plan view of screen 608. For this embodiment, screen 608 includes an alert header list 610. Alert header list 610 has any number of associated alert headers. Alert header 612, 614, 616, and 618 are shown in FIG. 7B. Arrow 620 indicates that additional alert headers are available for display on screen 608 and instructs the user to scroll, up and down, to view more alert headers. In other embodiments, arrow 620 is some other form of graphical object.

In general, all notifications not previously purged are available in alert service 108 with the most recent notification at the top of alert header list 610. In one embodiment, alert service 108 sends an alert message to DMA 140 with a message that contains: an identification of the alert provider 104 that originated the alert message, a summary of the content of the user alert message, and a choice to either accept the user alert message or to deny its acceptance. Applications, running on DMA 140 or a computer device coupled to DMA 140, retrieve user alert messages from alert service 108 for subsequent display on a television screen. In alternative embodiments, alert service 108 sends user alert messages to DMA 140 automatically. Users may navigate between alerts, delete them, or select actions offered by a specific user alert message.

In each alert header 612-618, the subject of the user alert message is shown, such as subject 622 in alert header 612. If the length of the subject of the user alert message is longer than the alert header space, the user may scroll when the header is highlighted (or the header may scroll automatically when selected). The first alert header on screen 608, alert header 612, is highlighted when screen 608 is first rendered. User alert headers, and their corresponding alert messages, are numbered (per page—each page may start over at one). The user may highlight an alert header by pressing the number of the desired alert header on a remote control.

The time that each user alert message was received that day is displayed in each alert header 612-618. Otherwise, the date is shown for user alert messages received on previous days. For this embodiment, the date or time is right-justified. Unread user alert messages and their dates are displayed in bold or colored text (e.g., alert header 612 and 618), and the current and total number of pages of messages 624 are also displayed.

Scrolling of alert headers 610 is set to one page at a time. However, a user may set the scroll function to scroll one message at a time. With scrolling set at one page at a time, if the bottom alert header is highlighted, and the user presses the down arrow 620, screen 608 refreshes the screen with a completely new page of alert headers 610 with the top alert header highlighted. Pressing an up button or down button (or specialized up/down buttons) on remote control 132 brings up the previous or next page of alert headers 610, regardless of which alert header is highlighted.

At step 508, a user selects an alert header from screen 608 of FIG. 7B to bring up an alert reader screen 626 of FIG. 7C. FIG. 7C illustrates a plan view of alert reader screen 626. Alert message text 628 and options 630 are displayed on alert reader screen 626. In one configuration, alert message text 628 is displayed on the left side and options 630 is displayed on the right side of alert reader screen 626.

Alert subject 622 of the alert header selected from screen 608 of FIG. 7B appears as title 632 in FIG. 7C. If the user presses an up button or down button on remote control 132, with the alert message text 628 highlighted, the system then scrolls up and down the alert message text 628 a page at a time. In other embodiments, the user uses a specialized remote having separate menu navigation buttons.

FIG. 7D is a plan view of an example screen (634) from the alert notification application. For this embodiment, options 630 appear as a menu on the right side of screen 626. At step 510, a user moves the cursor to the right to highlight access options 630. At step 512, the user moves the cursor up and down to select one option 630. The operation of the buttons on options 630 is similar to the operation of first action button 406, second action button 408, launch application button 410, and clear button 412 of FIG. 5. In addition, options 630 include a previous alert button 636, a next alert button 638, and a delete alert button 640. Ideally, each button on option 630 is dimmed until the user moves the cursor over the button to highlight it. At step 514, the user may select clear button 412.

The user alert messages have action items associated with them. The action items are selected through first action button 406 and second action button 408. An action item allows the user to execute a specific action in response to user alert message. For example, the user alert message may be a message from an online auction stating that the user was just outbid in an auction. For this example, if the user selects an action button, the user is automatically directed to the web page of the online auction or automatically enters a bid of $1 over the highest bid. If the user alert message relates to the sale of securities, then the user alert message may include an actionable item 406 to sell. If the user selects the action button in the example, a sell order is sent to the user's online broker's house. In other words, if the user is happy with the stock price, the user may select a sell button 408 and sell the stock.

In one embodiment, the user may launch an application associated with user alert messages. In one implementation, the application is launched as a remote application with the display mechanism described above. The application may run natively on the DMA, on a personal computer (PC), a specialized home media server device, or run on a server across network 102. The application remotes the user interface to the DMA which translates the message and displays it on the television. In one embodiment, the remoted portion of the user interface runs on the DMA, and the DMA displays screens for the user interface on the television and receives user interface input information from the television remote control. The launch application button (410) is shown in FIG. 5.

The launch application feature allows a user to act immediately upon the user alert message. For example, the user alert message may relate to a bid of an auction the user has placed on an Internet auction web site. In response to the user alert message from the Internet auction provider, the user may launch an application, such as a web browser, to allow the user to view the current bid and to submit a new bid. If launching a supporting application is not possible on the platform the user accesses the alerts messages, the option to launch the application may be removed. The user may also dismiss the user alert message by depressing done button 412 (FIG. 5). If the done button 412 is pressed, the system does not take any action on the content of the user alert message.

A user may view the list of unread user alert messages queued on alert service 108 at a later time. A DMA may also maintain a list of unread user alert messages. Each user alert message may be assigned an expiration date. Upon reaching the expiration date, the user alert message is removed from the user alert message queue. The time expiration function for user alert messages clears messages that no longer have value to the user. The function also reduces the number of unwanted user alert messages stored on database 146.

In one embodiment, a user may access their user alert messages on alert service 108 through a web interface. Through a web interface, users may view messages, and may take action on their messages. In addition, users may subscribe to have their user alert messages forwarded to an email account. Users may install on their PC a user message alert service provided by alert service 138 and subscribe to have their alerts delivered to their PC.

If the user depresses manage alert services button 606 of FIG. 7A, the system displays alert management options. This screen of the user interface allows users to set global settings and to control how notifications interrupt television, video or other applications. The alert management options application may display all the active alert services that the user has subscribed. As part of the alert management options, users may approve (confirm) any alert provider 104. The approval feature permits the user to select alert providers allowed to send messages to the user. A user may also remove any alert providers from the approved list.

Users may specify the means that alert providers 104 may use to notify the user. For example, the user may specify whether notification occurs by box light 306, icon notification 308, or banner or full screen text message 310. By contrast, the user alert message may specify the type of notification 304. Users may set the volume for sound notification, turn off all notifications (including box light 306), and set allowable notifications for classes of applications, such as urgent, not-urgent, and junk classes of applications. The user may turn off all notification through use of a "black hole" button. There may be times where the user absolutely does not want to receive notifications (e.g., the user is enjoying content on a television). The black hole button permits the user to send all alerts into the background, even preventing the flashing light to appear on the DMA. The user may later return the system to the normal alert notification state.

There may be three levels of audio feedback (all, important, none) with three volume levels (high, medium, and low). For the "all" level of audio feedback, every action is accompanied with audio. For the "important" level of audio feedback, items delayed before the action starts may have audio feedback. Also, errors and the completion of long tasks may have audio feedback. Where the "none" level of audio feedback is selected, no sound is made from any alert or action.

As noted above, user alert messages may be pre-categorized into three levels of alert severity prior to entering the user's household 106. The alert messages may be categorized as informational, important, and critical. The user further may have the capability to detail each of the three levels of alert severity to reflect how important each severity message is to that user. For example, the user may change the settings so that the messages for both informational alerts and critical alerts appear on window 312. The user may change the settings so that the messages for all three levels of alert severity appear on window 312 or that none of the three alerts appear on window 312. The user may also tailor the severity level for a specific third party provider. For example, all alert messages received from a stockbroker may be categorized as a critical severity alert identification. For this example, the user may pre-establish such alert messages as critical. Thus, even though the stockbroker may have pre-categorized its alert message to an informational severity level, the user may override such a setting by categorizing all messages from the stockbroker as critical messages.

Home media system 138 may periodically check alert service 108 for software updates and automatically upgrade itself when one is available. In one embodiment, a DMA may forego attempting to upgrade itself if any remote activity has occurred within the last three hours. The DMA may also display a warning message before upgrading. Users may disable the automatic upgrade in the DMA setup menu through the alert management options. An upgrade may send a user alert message notification to the DMA as the upgrade is installed. Upgrades that change any user interface or add or delete any functionality may also cause a user alert message notification to be sent to the DMA.

The alert management options may have a consistent intuitive interface. DMA 140 may present a palette of controls and navigation heuristic that repeats everywhere in the interface (i.e., all screens generally have the same look and feel). DMA 140 may give predetermined time response (e.g., 0.2 second responses) to all user-actions, whether by sound, blinking LEDs or actually delivering the desired request.

As a security option, the authenticity of each alert message may be certified. The user may have control over some aspects of the authentication process. For example, the user may engage user settings in household 106 to reach out and eliminate any alert message from the alert queue in the user's partitioned portion of alert service 108 that did not come from a trusted source. By eliminating at alert service 108 any alert message from the user's alert queue that did not come from a trusted source, the user may prevent such an alert from entering the user's home and disrupting the user. By authenticating at alert service 108 and giving the user some control over the authentication process, the user is assured that a user alert message brought into household 106 is from the source claimed in the alert and the alert is something that the user cares about.

Alert distribution system 100 may provide a mechanism for an application creator to allow a time-expired free trial of an application, as well as a simple way to purchase applications from the DMA, via the remote. A series of applications may be stored on alert service 108 to demonstrate the differentiating features of DMA 138 over competing DMAs. Further, DMA 138 may include at purchase time a series of remoted applications that increase the value of DMA 138 and make remoted applications a more important part of the consumer purchase and out of box experience. For example, DMA 138 may include X-10 control, Wifi camera control, Portal data display (news, weather, stocks), a sports news, and scores alerts service.

Consumer electronic manufacturers may install DMA 138 into television 122 or users may acquire DMA 138 separately as a box. In some embodiments, custom installation of DMA 138 will not be necessary, particularly where consumer electronic manufacturers install DMA 138 into television 122.

Alert distribution system 100 may directly notify users of alert messages while enjoying their leisure time and provides a simple, intuitive way to obtain alert messages for all household members, including children. This keeps the user from checking email or waiting for phone calls while enjoying their leisure time. Giving the user the flexibility to receive some alert messages asynchronously on their television while they are consuming entertainment gives the user more enjoyment out of the entertainment.

Aspects of the system include the interruption of a user's television viewing with an alert from any source on an alert service. The system is generic, available to anyone, and not limited to those having a Personal Video Recorder (PVR) or set top box. The system may include a notification gateway that any third party may connect into and rules as to whether that message should be passed onto the end user.

Figure 8:
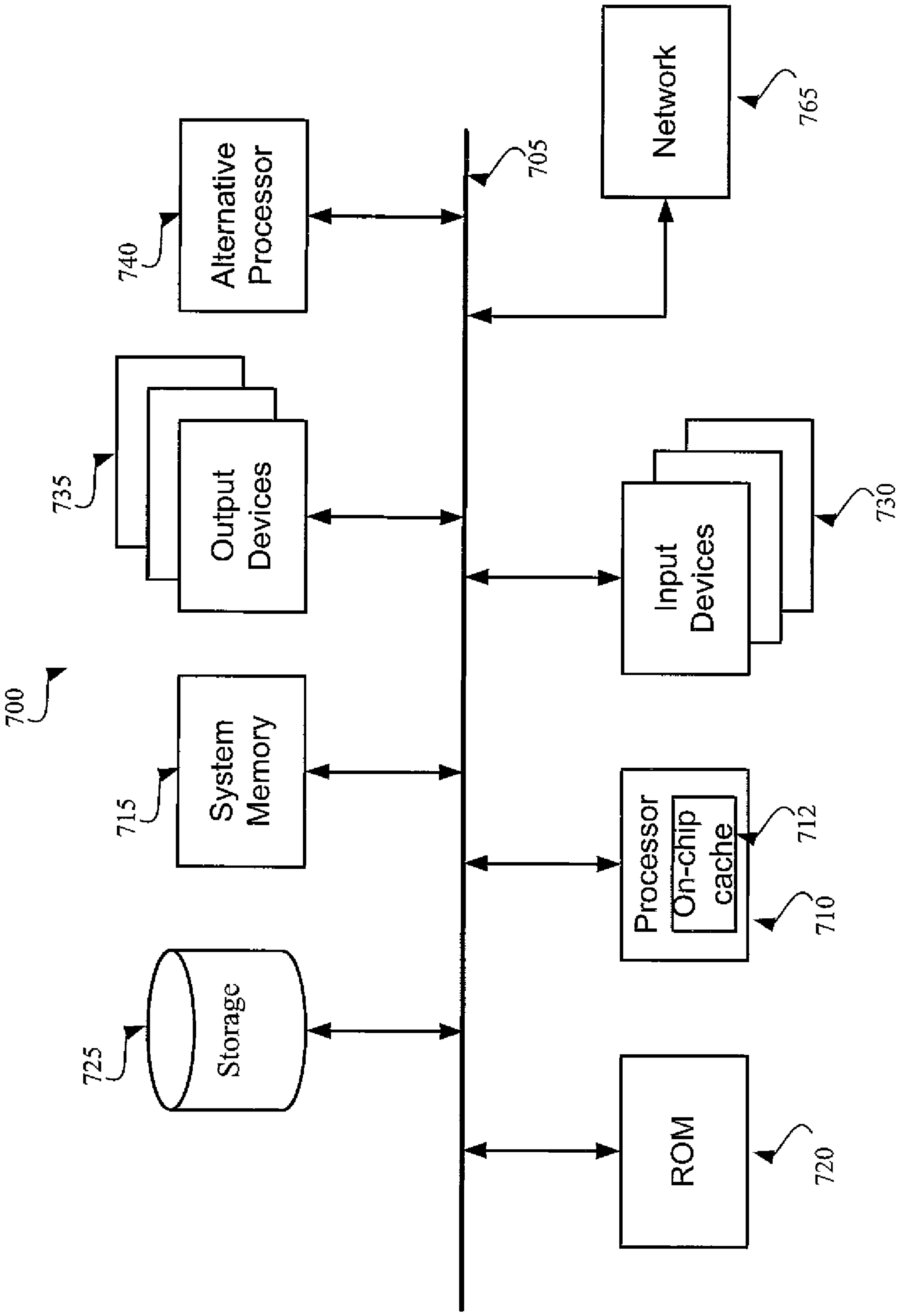
FIG. 8 is a computer system 700 with which some embodiments of the invention may be implemented.

FIG. 8 is a computer system 700 with which some embodiments of the invention may be implemented. In some embodiments, the techniques of the present invention may be hard-coded into hardware devices dedicated specifically for graphics production and/or implemented in computer executable instructions stored in a computer readable medium (software).

The computer system 700 may include a bus 705, a processor 710, a system memory 715, a read-only memory 720, a permanent storage device 725, input devices 730, output devices 735, and an alternative processor 740. Some or all of the items of computer system 700 may be included in a compiling unit or included in a control processor.

The bus 705 may collectively represent all system, peripheral, and chipset buses that communicatively connect the numerous internal devices of the computer system 700. For instance, the bus 705 may communicatively connect the processor 710 with the read-only memory 720, the system memory 715, and the permanent storage device 725.

The read-only-memory (ROM) 720 may store static data and instructions that may be needed by the processor 710 and other modules of the computer system. The permanent storage device 725, on the other hand, may be a read-and-write memory device. This device may be a non-volatile memory unit that stores instruction and data even when the computer system 700 may be off. Some embodiments of the invention may utilize a mass-storage device (such as a magnetic or optical disk and its corresponding disk drive) as the permanent storage device 725. Other embodiments may utilize a removable storage device (such as a floppy disk or Zip® disk, and its corresponding disk drive) as the permanent storage device.

Like the permanent storage device 725, the system memory 715 may be a read-and-write memory device. However, unlike storage device 725, the system memory may be a volatile read-and-write memory, such as a random access memory (RAM). The system memory may store some of the instructions and data that the processor needs at runtime.

In some embodiments, instructions and/or data needed to perform methods of the present invention may be stored in the system memory 715, the permanent storage device 725, the read-only memory 720, or any combination of the three. For example, the various memory units may contain instructions of an application and/or graphics data generated by the application. In some embodiments, the system memory 715 and/or the permanent storage device 725 may comprise a cache and/or buffer.

From these various memory units, the processor 710 may retrieve instructions to execute and data to process to perform the processes of the present invention. In some embodiments, the processor 710 may utilize an on-chip cache 712 to hold data recently accessed or produced by the processor 710. In some embodiments, the alternative processor 740 may execute instructions and processes data to perform the processes of the present invention.

The bus 705 also may connect to the input and output devices 730 and 735. The input devices 730 may enable a user to communicate information and select commands to the computer system 700. The input devices 730 may include alphanumeric keyboards and cursor-controllers. The output devices 735 may print or display images generated by the computer system 700. The output devices may include printers and display devices, such as cathode ray tubes (CRT) or liquid crystal displays (LCD).

Finally, as shown in FIG. 8, the bus 705 also may couple the computer system 700 to a network 765 through, for example, a network adapter (not shown). In this manner, the computer system 700 may be a part of a network of computers (such as a local area network ("LAN"), a wide area network ("WAN"), or an Intranet) or a network of networks (such as the Internet). Any or all of the components of the computer system 700 may be used in conjunction with the present invention. However, one of ordinary skill in the art would appreciate that any other system configuration also may be used in conjunction with the present invention.

Those of skill would appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Moreover, method steps may be interchanged without departing from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may be read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or utilize the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. Thus, one of ordinary skill in the art would understand that the invention is not to be limited by the foregoing illustrative details, but rather is to be defined by the appended claims.

What is claimed is:

1. A method for an alert service, comprising:

receiving at the alert service an alert message from an alert provider;

assigning an alert level to the alert message based on the alert provider;

determining a user designated to receive the alert message;

receiving, from the user, settings for the alert provider;

modifying the alert level of the alert message based on the settings for the alert provider; and sending the alert message to the user designated to receive the alert message.

2. The method of claim 1, further comprising:

determining that the settings permit generating for display the alert message; and generating for display the alert message.

3. The method of claim 2, the method further comprising:

before generating for display the alert message, determining that the settings permit automatically generating for display the alert message, wherein the alert message is generated for display without requiring further user input.

4. The method of claim 2, the method further comprising:

before generating for display the alert message, determining that the settings do not permit automatically generating for display the alert message;

generating for display an icon representing the alert message; and receiving an input from the user to generate for display the alert message.

5. The method of claim 1, the method further comprising:

altering the alert message prior to sending the user alert message to the user designated to receive the alert message.

6. The method of claim 5, wherein altering the alert message comprises:

assigning an interruption type to the alert message that determines a manner in which the alert message is announced.

7. The method of claim 6, wherein the interruption type is at least one of: no interruption, a box light interruption, an icon notification interruption, and text message interruption.

8. The method of claim 1, the method further comprising:

after receiving the alert message from the alert provider, authenticating that the alert message is from a trusted source.

9. The method of claim 5, wherein altering the alert message comprises:

adding or removing content of the received alert message.

10. A non-transitory computer readable medium having instructions stored thereon for an alert service, the non-transitory computer readable medium comprising sets of instructions for:

receiving an alert message from an alert provider;

assigning an alert level to the alert message based on the alert provider;

determining a user designated to receive the alert message;

receiving, from the user, settings for the alert provider;

modifying the alert level of the alert message based on the settings for the alert provider; and sending the user alert message to the user designated to receive the alert message.

11. The non-transitory computer readable medium of claim 10, further comprising a set of instructions for:

altering the alert message prior to sending the alert message to the user designated to receive the alert message.

12. The non-transitory computer readable medium of claim 11, wherein the set of instructions for altering the alert message comprises a set of instructions for:

assigning an interruption type to the alert message that determines a manner in which the alert message is announced.

13. The non-transitory computer readable medium of claim 12, wherein the interruption type is at least one of: no interruption, a box light interruption, an icon notification interruption, and text message interruption.

14. The non-transitory computer readable medium of claim 11, wherein the set of instructions for altering the alert message comprises a set of instructions for:

adding or removing content of the received alert message.

15. The non-transitory computer readable medium of claim 10, further comprising a set of instructions for:

after receiving the alert message from the alert provider, authenticating that the alert message is from a trusted source.

16. The non-transitory computer readable medium of claim 10, further comprising a set of instructions for:

determining that user settings permit generating for display the alert message; and generating for display the alert message.

17. The non-transitory computer readable medium of claim 16, further comprising a set of instructions for:

before generating for display the alert message, determining that the user settings permit automatically generating for display the alert message, wherein the alert message is generated for display without requiring further user input.

18. The non-transitory computer readable medium of claim 16, further comprising a set of instructions for:

before generating for display the alert message, determining that the user settings do not permit automatically generating for display the alert message;

generating for display an icon representing the alert message; and receiving an input from the user to generate for display the alert message.

19. An alert message distribution system, comprising:

an alert service configured to:

receive an alert message from the at least one alert provider;

assign an alert level to the alert message based on the alert provider;

determine a user designated to receive the alert message;

receiving, from the user, settings for the alert provider;

modify the alert level of the alert message based on the settings for the alert provider; and send the alert message to a digital media adaptor (DMA), the DMA being configured for being in communication with the alert service.

20. The alert distribution system of claim 19, wherein the alert service is further configured to:

determine that user settings permit generating for display the alert messages; and generate for display the alert message.

21. The alert distribution system of claim 20, wherein the alert service is further configured to:

before generating for display the alert message, determine that user settings permit automatically generating for display the alert message, wherein the alert message is generated for display without requiring further user input.

22. The alert distribution system of claim 20, wherein the alert service is further configured to:

before generating for display the alert message, determine that the settings do not permit automatically generating for display the alert message;

generating for display an icon representing the alert message; and receiving an input from the user to generate for display the alert message.

23. The alert distribution system of claim 19, wherein the alert service is further configured to:

alter the alert message prior to sending the user alert message to the user designated to receive the alert message.

24. The alert distribution system of claim 23, wherein altering the alert message comprises the alert service being further configured to:

assign an interruption type to the alert message that determines a manner in which the alert message is announced.

25. The alert distribution system of claim 24, wherein the interruption type is at least one of: no interruption, a box light interruption, an icon notification interruption, and text message interruption.

26. The alert distribution system of claim 19, wherein the alert service is further configured to:

after receiving the alert message from the alert provider, authenticate that the alert message is from a trusted source.

27. The alert distribution system of claim 23, wherein altering the alert message comprises the alert service being further configured to:

add or remove content of the received alert message.

* * * * *